United States Patent [19]

Macey

[11] Patent Number: 4,482,140

[45] Date of Patent: Nov. 13, 1984

[54] START-UP CIRCUITRY FOR STITCHING ASSEMBLIES AND THE LIKE

[75] Inventor: Keith S. Macey, Rocky River, Ohio

[73] Assignee: K. S. Macey Machine Company, Inc., Cleveland, Ohio

[21] Appl. No.: 440,872

[22] Filed: Nov. 12, 1982

[51] Int. Cl.[3] .......................... B42G 1/02; H02P 1/04

[52] U.S. Cl. ...................................... 270/53; 318/391

[58] Field of Search .................................. 270/53-58, 270/37; 227/100-105, 129, 131; 307/31, 126, 139, 140, 141.4; 318/305, 306, 309, 391, 400, 431

[56] References Cited

U.S. PATENT DOCUMENTS

| | | | |
|---|---|---|---|
| 2,482,371 | 9/1949 | Rosenmund | 227/102 |
| 3,173,592 | 3/1965 | Herbst | 227/102 X |
| 3,235,153 | 2/1966 | Crim | 227/102 X |
| 3,502,255 | 3/1970 | Hermann et al. | 270/53 |
| 3,554,531 | 1/1971 | Heigl | 270/53 |
| 3,594,625 | 7/1971 | Richardson | 318/305 X |
| 3,662,190 | 5/1972 | Naber | 227/131 X |
| 3,664,564 | 5/1972 | Stanton et al. | 227/100 |
| 3,743,907 | 7/1973 | Dosch et al. | 318/391 X |
| 3,819,996 | 6/1974 | Habisohn | 318/391 X |

*Primary Examiner*—E. H. Eickholt
*Attorney, Agent, or Firm*—Fay & Sharpe

[57] ABSTRACT

A chain conveyor (40) continuously feeds workpieces from a plurality of feed stations (10, 12, 14) to a reciprocating work station (B). A power supply (D) includes an electric motor (100) for providing motive power to the apparatus, and an electric power control circuit (102) for controlling the amount of electric power supplied to the motor. The power control circuit includes a plurality of resistive elements (124*a*, 124*b*, 124*c*) connected in series between the motor and power supply lines (112*a*, 112*b*, 112*c*). When a jog switch (126) is held closed, electrical power is provided to a main control relay (120) closing normally open relay contacts (120*a*, 120*b*, 120*c*). This provides electric power to the motor though the resistive elements causing the motor to be rotated at a slower speed. When a run switch (130) is closed concurrently with the job switch, a time controlled switch (144) starts timing a preselected duration while the motor rotates at the slower speed . After the preselected duration, the time controlled switch actuates a timing control relay (142) closing normally open contacts (142*a*, 142*b*, 142*c*) disposed in parallel with the resistive elements. In this manner, the resistive elements are by-passed and full power is delivered to the motor after the preselected duration causing it to operate at its normal, faster speed.

16 Claims, 1 Drawing Figure

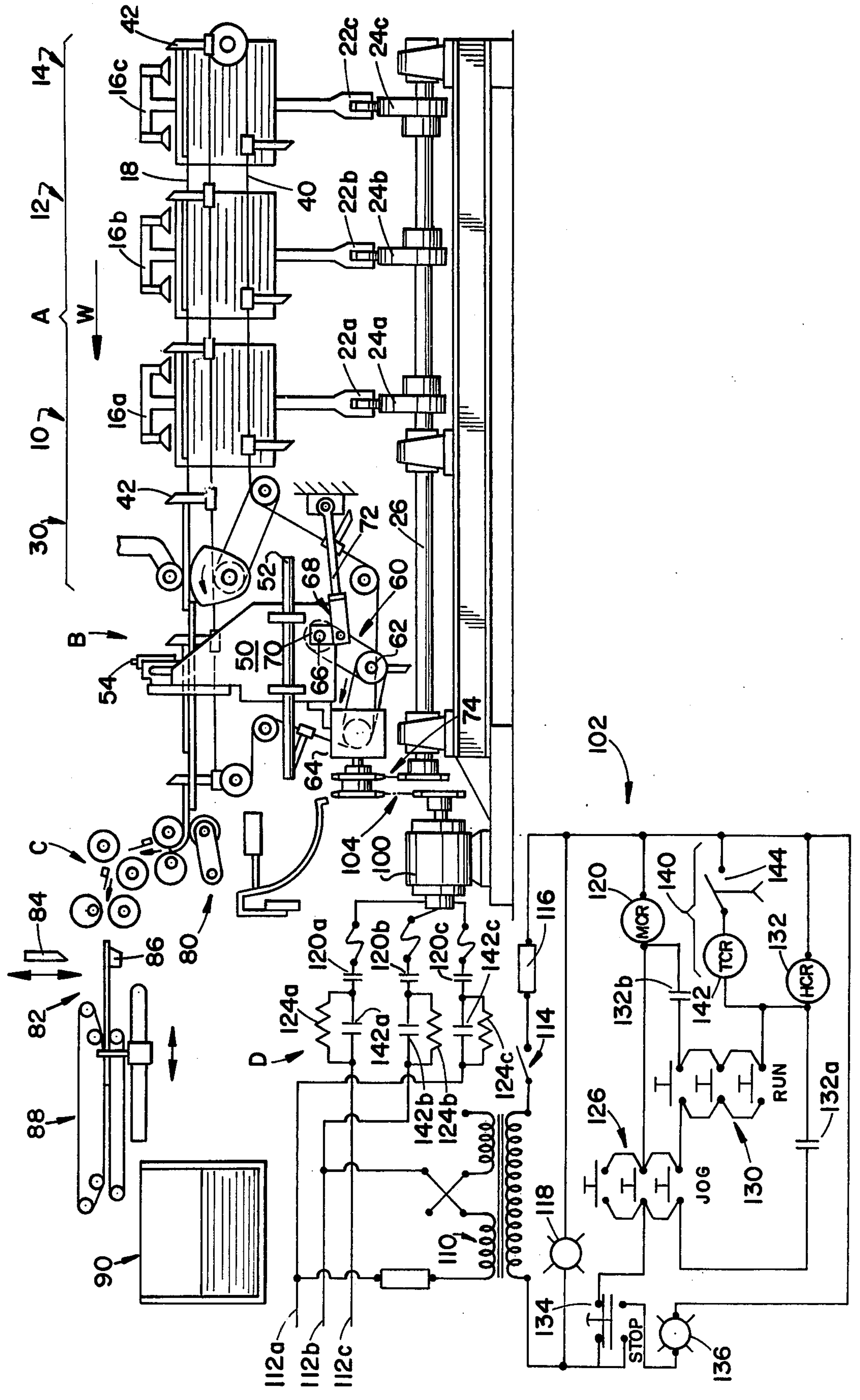
14
12
A
10
30
W
B
C
D
42
16c
16b
16a
18
40
22c
24c
22b
24b
22a
24a
26
52
72
68
60
50
70
62
66
54
74
64
104
100
102
84
86
82
80
88
90
120
MCR
140
144
TCR
132
HCR
116
120a
120b
120c
142c
132b
142
124a
142a
142b
124b
124c
114
126
130
RUN
132a
JOG
118
110
134
STOP
136
112a
112b
112c

START-UP CIRCUITRY FOR STITCHING ASSEMBLIES AND THE LIKE

BACKGROUND OF THE INVENTION

This invention pertains to the art of electrically powered machinery. The invention finds particular application in conjunction with binding and stitching apparatus and will be described with particular reference thereto. It is to be appreciated, however, that the invention is also applicable to other electrically powered machines, particularly those which experience relatively high inertial forces during start-up from eccentric mass distributions, or the like.

Of the many prior binding apparatus and machines heretofore made available, one has found particularly significant commercial success. This apparatus is shown and described in U.S. Pat. No. 3,554,531 to Heigle et al., issued June 12, 1971. Briefly stated, the apparatus includes means for sequentially placing printed sheets into ordered stacks at spaced intervals along a workpath. A continuously moving conveyor feeds the stacks to a reciprocating shuttle mechanism which removes each stack from the conveyor to a stationary stitcher assembly. Following stitching, the stacks are moved to further processing stations along the workpath as required to complete a particular work requirement. Such additional processing stations may accommodate folding, trimming, sorting, collating, and the like. An electric motor is mechanically connected with the continuous moving conveyor, the reciprocating shuttle, and the stitcher for providing motive power thereto. The motor has sufficient speed and power characteristics for driving the stitching mechanism at a fixed rate, which is adequate to process about a forty-five hundred (4,500) stacks per hour.

Although the foregoing binding apparatus has found commerical success, it does have certain practical drawbacks. For example, the AC motor is controlled by an electrical control circuit which is only able to supply full power or no power to the motor. This causes the motor to drive the binding apparatus rapidly to its full operating speed at apparatus start-up. Such rapid acceleration tends to cause excessive wear, particularly on eccentric and reciprocating parts as well as to the electric motor itself. The high torques required for the rapid start-up may necessitate the use of an electric motor which is larger and more power consumptive than necessary for steady state operating conditions.

The present invention contemplates a new and improved start-up circuit for automated binding apparatus and the like which overcomes the above referenced problems and others. The invention provides a start-up apparatus which causes less wear, requires less power, is more economical to manufacture, and is simplier to maintain and adjust.

BRIEF SUMMARY OF THE INVENTION

In accordance with the invention, a binding apparatus is provided for binding stacks of sheets which are being conveyed along a workpath and a feeding means conveys stacks of sheets along the workpath. A reciprocating stitcher assembly is disposed along the workpath for stitching the stacks of sheets conveyed therealong. A finishing means thereafter performs finishing operations on the stitched stacks. A power supply means provides mechanical motive power in coordination to the feeding means and to the reciprocating stitcher assembly selectively at (1) a slower speed and (2) a faster speed. In this manner, the stacks are conveyed by the feeding means and stitched by the reciprocating stitcher assembly in coordination at either the slower or faster speed as may be selected.

In accordance with another aspect of the invention, there is provided an electrically powered apparatus for performing work operations on a plurality of workpieces. A feeding means conveys the workpieces along a workpath and a reciprocating work station assembly performs a work operation on each workpiece. The work station assembly is mounted along the workpath and includes a reciprocating means for cyclically reciprocating at least a portion of the work station assembly. A power supply means supplies motive power to the reciprocating means and the feeding means to selectively move them at a slower speed and a faster speed. The power supply means includes an electrical motor which is operatively connected with the feeding and reciprocating means to supply motive power in coordination thereto. A run switch selectively causes electrical power to be provided to the motor. A timing means causes a smaller amount of electrical power to be provided to the motor for a preselected duration commencing with closing of the run switch and a larger amount of electric power to be provided subsequent to the preselected duration. In this manner, the electric motor drives the feeding and reciprocating means at the slower speed when the run switch is first closed and at the faster speed following the preselected duration.

The present invention is advantageous in that it provides a new and improved control circuit for electrically powered apparatus which is relatively economical to manufacture and assemble.

Another advantage of the present invention resides in the provision of a control circuit which is easier to adjust and maintain.

Still further advantages of the present invention will become apparent to those skilled in the art upon a reading and understanding of the following detailed description.

BRIEF DESCRIPTION OF THE DRAWING

The invention may take form in certain parts and arrangements of parts, a preferred embodiment of which will be described in detail in this specification and illustrated in the accompanying drawing which forms a part hereof and wherein:

the FIGURE is a diagrammatic illustration of automated binding apparatus incorporating improved start-up circuitry in accordance with the present invention.

DETAILED DESCRIPTION OF THE PREFERRED EMBODIMENT

Referring now to the drawing wherein the showings are for purposes of illustrating the preferred embodiment of the invention only, and not for limiting same, the FIGURE shows a feeding means A which continuously conveys workpieces longitudinally along a workpath in the direction of arrow w. An eccentrically operated first work station B cyclically operates upon each of the workpieces moving longitudinally along the workpath. In the preferred embodiment shown, the workpieces comprise stacks of sheets and the work station includes a stitcher assembly which cyclically receives and stitches the stacks. A further work station C performs appropriate additional operations on the workpieces. Particular to the preferred embodiment, the work station C performs various finishing operations on the bound stacks, eg., folding, trimming, stacking, and the like. A power supply means D provides motive power at a selected speed to the feeding means and the work stations.

More particularly, the feeding means A includes a plurality of feed stations 10, 12, and 14, each of which includes known means for separating individual printed sheets from a source or pile. The separating means include pneumatic arm assemblies 16*a*, 16*b*, and 16*c* which are pivotally mounted on a binding apparatus frame. The pneumatic arm assemblies stack the separated sheets on printed sheets being conveyed along an inclined conveying surface 18. The arm assemblies terminate at one end in cam followers 22*a*, 22*b*, and 22*c* which engage cams 24*a*, 24*b*, and 24*c* mounted on a central drive shaft 26. Although only three feed stations are illustrated, it will be appreciated that a greater or lesser number may be suitably employed. Typically, the number of feed stations utilized matches the number of sheets to be bound.

An inspection station 30 is disposed at the down stream end of the feed stations to inspect the workpieces feed therefrom. In the preferred embodiment, the inspection station includes a thickness caliper means which determines whether the appropriate number of sheets have been fed into each stack.

The feeding means A also includes a continuous chain conveyor 40 which cyclically moves the workpieces from feed station to feed station and to the first work station B. The conveyor includes a plurality of regular spaced dogs 42 which extend through the inclined conveying surface 18. These dogs move continuously past the feed stations at regular spaced intervals to engage and convey the workpieces, i.e. sheets and resultant stacks, longitudinally along the work path.

The first work station B comprises an eccentrically weighted, reciprocating work station. In the preferred embodiment, the first work station takes the form of a stitcher assembly which inserts a stitch or the like into each workpiece or stack being conveyed therethrough. The stitcher assembly includes a work station frame 50 which is slidably mounted on a guide means or bar 52 at one side and an analogous guide means (not shown) at its other side. An operation or work performing means 54, such as a stitcher head, is mounted on the work station frame for stitching or otherwise performing some desired operation on each workpiece moving therethrough.

A reciprocating means 60 cyclically reciprocates the frame 50 and other parts of the stitcher assembly longitudinally along the workpath in coordination with the longitudinal movement of the conveyor 40. The reciprocating means 60 includes a power take-off assembly 62 which comprises a dog leg belt drive arrangement for providing motive power from a gearbox assembly 64 to a first work station drive shaft 66 mounted on the frame 50. The first work station drive shaft 66 is operatively connected with the stitcher head 54 to provide the motive power thereto. Further, the first work station drive shaft is operatively connected with a reciprocating drive means 68 which drives the stitcher assembly through the cyclic reciprocations. Specifically, the reciprocating drive means includes a lever arm 70 which is mounted on the first work station drive shaft and a connecting link 72 which is connected between the lever arm 70 and the binding apparatus frame. Thus, as the first work station drive shaft 66 rotates, the stitcher assembly is reciprocated with simple harmonic motion. Optionally, the stitcher or work performing means may be stationarily mounted and the reciprocating means may move the workpieces thereto.

The gearbox assembly 64 is interconnected with the chain conveyor 40 as well as the power take-off assembly 62 to provide coordinated motive power thereto. The gearbox is conveniently connected by a sprocket and chain assembly 74 with the main drive shaft 26. In this manner, the conveyor chain and the reciprocating means are driven in coordination with the rotation of the cams 24*a*, 24*b*, and 24*c*, hence the operation of the feed stations.

The further work station or finishing means C includes a folding mechanism 80 which has two modes of operation and is disposed downstream from the first work station B. In one mode, each stitched stack is folded along the stitching for producing a book-like configuration and in the other mode, no folding occurs. A trimming assembly 82, including a face-trim knife 84 and a bed knife 86, trims the free edges of the stitched materials. A feeder assembly 88 feeds completed work materials in the desired manner to a stacker 90 or other work collecting means. It is to be appreciated that the finishing stations are only exemplarly of ancilary work operations particularly suited for binding apparatus in the preferred environment of use for the subject invention. Still other types of finishing stations may advantageously be incorporated without anyway departing from the overall intent or scope of the present invention.

The power supply means D includes an electric motor 100 and an electrical power control circuit 102. The motor is operatively connected by a sprocket and chain drive 104 with the drive shaft 26 and the gear box assembly 64. In the preferred arrangement, a three phase electric motor is utilized, but it will be readily appreciated that the invention is equally applicable to use with single phase motors. A transformer 110 reduces the voltage from power supply lines 112*a*, 112*b*, and 112*c* to the appropriate voltage for other components of the control circuit. Typically, the power supply lines provide 220 VAC. However, those of ordinary skill will select an appropriate transformer for 440 VAC and other common line voltages without departing in anyway from the present invention. A main power switch 114 selectively provides electrical power to the control circuit. A fuse 116 provides protection to the control circuit and an indicator lamp 118 indicates whether the power supply switch 114 is open or closed, i.e. whether or not the control circuit is electrically actuated.

The control circuit includes a main control relay 120 having normally open sets of relay contacts 120*a*, 120*b*, and 120*c* which are connected in series between the electric motor and the power supply lines 112*a*, 112*b*, and 112*c*, respectively. When the main control relay 120 is actuated, each of the contacts 120*a*, 120*b*, and 120*c* closes for allowing electrical power to flow to the motor. Voltage dropping resistive elements 124*a*, 124*b*, and 124*c* are connected in series between the power supply lines 112*a*, 112*b*, and 112*c* and the normally open main control relay contacts 120*a*, 120*b*, and 120*c*, respectively. In this manner, when the main control relay is actuated, the electric motor receives a reduced amount of power from the resistors. This reduction of power by the resistors slows the rotational speed of the motor relative to the rotational speed which it would attain at full power.

The reduction in the rotational speed of the motor is selected by choosing resistors of the appropriate size. In the preferred embodiment here under discussion, the resistors are sized such that the motor starts but its rotational speed is slowed to approximately ½ to ⅔ the speed at which it would rotate if directly connected with the power supply lines. Although the resistor size may vary with the motor selected, it has been found that with a 220 VAC power supply 6½ to 7 ohm resistors slow the motor sufficiently, yet pass sufficient power to start the motor. With a 440 VAC power supply, 14 to 15 ohm resistors have been found to be satisfactory. If desired, the resistors may be variable to facilitate selections in the slower speed obtained.

A jog push button switch 126 is connected in series with the coil of the main control relay 120 for selectively actuating same. Specifically, the jog push button actuates the main control relay closing the normally open sets of contacts 120*a*, 120*b*, and 120*c* when the jog push button is held down and releases them when the push button is released. This enables the operator to selectively advance the feeding means, reciprocating means, and the like at a relatively slow speed to position them for calibration and adjustment.

The control circuit further includes a run push button switch 130 for actuating the main control relay when it is closed. The run push button switch actuates a hold relay 132 which has normally open sets of relay contacts 132*a* and 132*b*. The normally open set of contacts 132*a* is connected in parallel with the series connected jog and run switches to provide electrical power to the hold relay coil. In this manner, and once actuated, the hold relay continues to hold itself actuated. The normally open set of hold relay contacts 132*b* is connected in series with the main control relay 120 and the parallel connected contact set 132*a* and the jog and run switches. Thus, whenever the hold relay is actuated, it actuates the main control relay.

A stop push button switch 134, which is normally closed, is connected in series with the source of power and the parallel connected hold relay contact set 132*a* and the run and jog switches. Opening the stop switch cuts off the flow of power to the hold relay to deactuate it. A stop indicator lamp 136 is connected with the stop switch such that it is illuminated when the stop push button is open.

As a safety feature, the jog switch 126 and the run switch 130 are connected in series with the hold relay 132. This necessitates that both the jog and run switches be held closed concurrently in order to actuate the hold relay.

A timing means 140 causes the motor to operate at its slower speed for a preselected duration after start-up and then to operate at its faster speed. Specifically, the timing means causes the resistors 124*a*, 124*b*, and 124*c* to be by-passed after the preselected duration once the run switch has been closed. By-passing the resistors causes the motor to be connected directly with the power supply lines 112.

In the preferred embodiment shown, the timing means 140 includes a timing control relay 142 having normally open contacts 142*a*, 142*b*, and 142*c* which are connected in parallel with resistors 124*a*, 124*b*, and 124*c*, respectively, and in series with the main control relay normally open contacts 122*a*, 122*b*, and 122*c*, respectively. In this manner, upon actuating the timing control relay, full power is supplied to the motor allowing it to operate at its faster speed.

The timing control relay 142 is connected in series with a timer 144 and the parallel connected run switch 130 and hold relay contacts 132*a*. Upon receiving power from the run switch or through the hold relay contacts 132*a*, the timer 144 starts a timing cycle. In the preferred construction, the timer comprises a time delayed switch which, after the selected duration, closes for actuating the timing control relay 142. A preselected duration of approximately 2 to 5 seconds has been found to be acceptable. The timer may be variable to alter the preselected duration if desired. Optionally, other timing means for changing the motor speed from the slower to the faster speed may be utilized. For example, the motor may be caused to move through a series of discrete intermediate speeds or through a continuum of intermediate speeds.

In operation, closing the jog push button switch 126 provides power to the main control relay 120. This, in turn, closes the main control relay normally open contacts 120*a*, 120*b*, and 120*c* providing electrical power from the power supply lines 112*a*, 112*b*, and 112*c* through the resistors 124*a*, 124*b*, and 124*c* to the motor 100 causing it to rotate at the slower speed. When the jog push button switch is released, the main control relay is deactuated, opening the main control relay contacts and stopping the motor. In this manner, the operator is able to advance the feeding means, the reciprocating means, and other mechanical parts at a relatively slow speed.

To start machine operation, the operator closes the run push button switch as well as the jog push button switch. This actuates the hold relay 132 supplying power to the main control relay 120 and to the timing means 140, even when the run and jog push buttons are released. This provides power to the motor through the resistors until the timing control relay 142 closes the normally open contacts 142*a*, 142*b*, and 142*c* for thus by-passing the resistors. This connects the motor directly with the power supply lines causing it to rotate at its faster speed. To stop the apparatus, the operator depresses the stop push button switch 134. This deactuates the hold control relay which, in turn, deactuates the main control relay stopping the motor.

The invention has been described with reference to the the preferred embodiment. Obviously, modifications and alterations will occur to others upon reading and understanding the preceeding specification. It is intended to include all such modifications and alterations insofar as they come within the scope of the appended claims or the equivalents thereof.

Having thus described a preferred embodiment of the invention, it is now claimed:

1. A binding apparatus for binding stacks of sheets which are being conveyed along a workpath, the apparatus comprising:

a feeding means for conveying stacks of sheets along a workpath;

a reciprocating stitcher assembly disposed along the workpath for stitching the stacks of sheets conveyed therealong;

a finishing means for finishing the stitched stacks; and, a power supply including an electric motor for converting electrical power into mechanical and for selectively providing coordinated motive power to the reciprocating stitcher assembly and the feeding means, a run switch for selectively causing electrical power to be provided to the motor, and a timing means for causing a lesser amount of electrical power to be supplied to the motor upon actuation of the run switch to drive the feeding means and stitcher assembly at a first, slower speed, and a greater amount of electrical power to be supplied to the motor at some preselected duration thereafter to drive the feeding means and stitcher assembly at a second, faster speed, whereby at start-up the feeding means and stitcher assembly are driven at the first speed and at the second speed after the preselected duration.

2. The binding apparatus as set forth in claim 1 wherein at least one electrical resistive element is operatively connected in series with the electrical motor for decreasing the electrical power received by the electric motor and wherein the timing means includes remotely operated switching means operatively connected in parallel with the resistive element for selectively providing an electrical path around the resistive elements.

3. The binding apparatus as set forth in claim 2 wherein the remotely operated switching means includes a first relay having at least a set of normally open contacts in parallel with the resistive element for providing the electrical path around the resistive element when the first relay is actuated and wherein the timing means further includes a timer operatively connected with a coil of the first relay such that the timer actuates the first relay generally at said preselected duration after closing of the run switch.

4. The binding apparatus as set forth in claim 2 wherein the power supply further includes a main control relay connected in series with the run switch and having normally open contacts connected in series with the electric motor, the remotely operated switching means, and the resistive elements such that actuating the run switch actuates the main control relay closing its normally open contacts to supply electric power to the motor.

5. The binding apparatus as set forth in claim 4 further including a jog switch which is connected in series with the run switch and the timing means such that the jog switch and the run switch must both be closed to start the timing means.

6. The binding apparatus as set forth in claim 5 wherein the jog switch is connected with the main control relay in parallel with the run switch such that closing the jog switch actuates the main control relay causing power to be supplied to the electric motor through the resistive elements, whereby the motor is operated at the first speed as along as the jog switch is closed.

7. The binding apparatus as set forth in claim 5 further including a hold relay having a coil which is connected in series with the run switch such that closing the jog and run switches actuates the hold relay, the hold relay having normally open contacts in parallel with the series connected jog and run switches such that once actuated the hold relay holds itself actuated.

8. The binding apparatus as set forth in claim 7 further including a normally closed stop switch connected in series with the hold relay such that pressing the stop switch deactuates the hold relay.

9. An electrically powered apparatus for performing work operations on a plurality of workpieces, the apparatus comprising:

a feeding means for conveying workpieces to be operated upon along a workpath;

a reciprocating work station assembly for performing a work operation on each workpiece, the work station assembly being mounted along the workpath and including reciprocating means for cyclically reciprocating same to position each workpiece to be operated upon by the work station assembly; and, a power supply means for selectively supplying motive power to the reciprocating means and the feeding means at least at (1) a slower speed and (2) a faster speed, the power supply means including an electric motor which is operatively connected with the reciprocating means and the feeding means to supply motive power thereto, a run switch for selectively causing electrical power to be provided to the motor, and a timing means for causing a smaller amount of electrical power to be provided to the motor for a preselected duration commencing upon closing of the run switch and for causing a larger amount of electrical power to be provided following the preselected duration such that the electric motor drives the reciprocating means and the feeding means at the slower speed when the run switch is first closed and at the faster speed after said preselected duration.

10. The apparatus as set forth in claim 9 wherein at least one resistive element is connected in series between the electric motor and electric power supply lines for reducing the electrical voltage supplied to the electric motor relative to the voltage of the power supply lines and wherein the timing means includes a remotely operated switching means operatively connected in parallel with the resistive element for selectively providing an electrical path around the resistive element and a timer for actuating the remotely operated switching means after the preselected duration.

11. The apparatus as set forth in claim 10 wherein the remotely operated switching means includes a relay with normally open contacts in parallel with the resistive element and a coil operatively connected with the timer.

12. The apparatus as set forth in claim 10 further including a main control relay having a coil connected in series with the run switch and having a set of normally open contacts connected in series with the electric motor and the resistive elements, whereby closing the run switch actuates the main control relay closing its normally open contacts to supply electric power to the motor.

13. The apparatus as set forth in claim 12 wherein a jog switch is connected with the main control relay coil in parallel with the run switch such that closing the jog switch actuates the main control relay causing power to be supplied to the electric motor through the resistive element, whereby the motor is operated at the slower speed as long as the jog switch is closed.

14. The apparatus as set forth in claim 12 further including a jog switch which is connected in series with the run switch and the timing means such that the jog switch and the run switch must both be closed to start the timing means.

15. The apparatus as set forth in claim 14 further including a hold relay, the hold relay having a coil which is connected in series with the run switch such that closing the jog and run switches actuates the hold relay, said hold relay further having normally open contacts in parallel with the series connected jog and run switches such that once actuated the hold relay holds itself actuated.

16. The apparatus as set forth in claim 15 further including a normally closed stop switch connected in series with the hold relay coil such that opening the stop switch deactuates the hold relay.

* * * * *